US012044162B2

(12) United States Patent
Injac

(10) Patent No.: US 12,044,162 B2
(45) Date of Patent: Jul. 23, 2024

(54) VALVE FOR A DUAL-VOLUTE TURBINE

(71) Applicant: BorgWarner Inc., Auburn Hills, MI (US)

(72) Inventor: Ivan Injac, Albisheim (DE)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 18/123,036

(22) Filed: Mar. 17, 2023

(65) Prior Publication Data

US 2024/0060446 A1 Feb. 22, 2024

(30) Foreign Application Priority Data

Aug. 16, 2022 (DE) ..................... 10 2022 120 683.1

(51) Int. Cl.
*F02B 37/18* (2006.01)
*F02B 37/22* (2006.01)

(52) U.S. Cl.
CPC ............ *F02B 37/183* (2013.01); *F02B 37/22* (2013.01)

(58) Field of Classification Search
CPC ..................................................... F02B 37/183
See application file for complete search history.

(56) References Cited

U.S. PATENT DOCUMENTS

| | | | | |
|---|---|---|---|---|
| 10,823,048 | B2 * | 11/2020 | Hottenbach | F02B 37/025 |
| 2015/0115189 | A1 * | 4/2015 | Jung | F02B 37/183 251/315.01 |
| 2017/0204782 | A1 * | 7/2017 | Marques | F16K 1/2014 |
| 2020/0240322 | A1 * | 7/2020 | Brinkert | F01N 13/107 |

FOREIGN PATENT DOCUMENTS

| | | | | |
|---|---|---|---|---|
| DE | 112018004550 T5 * | 5/2020 | | F01D 17/10 |
| DE | 102018220965 A1 * | 6/2020 | | F01D 17/10 |
| DE | 102020123178 A1 * | 3/2022 | | |
| WO | WO-2019190662 A1 * | 10/2019 | | F01D 17/105 |
| WO | WO-2020120988 A1 * | 6/2020 | | B23P 15/001 |
| WO | WO-2022048705 A1 * | 3/2022 | | |

* cited by examiner

*Primary Examiner* — Ngoc T Nguyen
(74) *Attorney, Agent, or Firm* — Howard & Howard Attorneys PLLC

(57) ABSTRACT

A valve (100) controls a volute connecting opening (240) and a bypass opening (250) of a dual-volute turbine (200). The valve (100) has valve closing body (110), a lever arm (120) and a spindle (130). The valve closing body (110) has a main body (111) and a collar (112). The valve (100) is of a monoblock design with the valve closing body (110), the lever arm (120) and the spindle (130) being made of a single part.

15 Claims, 5 Drawing Sheets

(B-B)

(A-A)

VALVE FOR A DUAL-VOLUTE TURBINE

CROSS-REFERENCE TO RELATED APPLICATIONS

This application claims priority pursuant to 35 U.S.C. § 119(a) to German Patent Application No. 102022120683.1 filed Aug. 16, 2022, which application is incorporated herein by reference in its entirety.

TECHNICAL FIELD

The present invention relates to a valve for controlling a volute connecting opening and a bypass opening of a dual-volute turbine. In particular, the present invention relates to a dual-volute turbine with a corresponding valve, as well as to an exhaust gas turbocharger with such a dual-volute turbine.

BACKGROUND

The individual mobility sector is experiencing a disruptive change. Especially, the increasing number of electric vehicles entering the market and stricter emission regulations of legislators demand higher efficiencies from traditional internal combustion engine (ICE) vehicles. Therefore, more and more vehicles are equipped with efficiency increasing measures, such as charging apparatuses and emission reduction devices. Well known are, for instance, charging apparatuses wherein a compressor may be driven by an electric motor (also referred to as e-charger) and/or driven by an exhaust gas powered turbine (also referred to as turbocharger). Generally, an exhaust gas turbocharger has a turbine with a turbine wheel, which is driven by the exhaust gas flow of the combustion engine. A compressor with a compressor wheel arranged on a common shaft with the turbine wheel compresses the fresh air drawn in for the engine. This increases the amount of air or oxygen available to the engine for combustion. This in turn increases the performance of the combustion engine. Furthermore, combinations of e-charger and turbocharger, so called electrically assisted turbochargers, are known wherein the turbine and at least in some operation conditions, an e-motor drive the common shaft and thereby the compressor wheel. Generally the mentioned charging apparatuses may not only be used in ICEs but also in, for instance, fuel cell motors.

In the state of the art, multi-channel turbines, which are used, for example, for six-cylinder engines, are particularly well known. Multi-channel turbines may also be referred to as multi-scroll turbines or multi-volute turbines. Dual-volute turbines or twin-volute turbines are example configurations of multi-volute turbines whereby a respective cylinder bank is fluidly coupled to each of the two volutes such that exhaust gas flows separated through the volutes.

In a twin-volute turbine, both volutes open to the turbine wheel at about the whole circumference of about 360° axially adjacently to each other. Thereby, a pressure connection between the two volutes of the twin-volute turbine and, thus, a pressure equalization of exhaust gas pulses of the two volutes is reached before the exhaust gases reach the turbine wheel.

In a dual-volute turbine each of the two volutes covers only a circumferential sub portion of the inlet to the turbine wheel. That means the two volutes open to the turbine wheel about circumferentially adjacently. Thereby, a pressure/flow separation of the exhaust gases is maintained until reaching the turbine wheel. A disadvantage of known dual-volute turbines is that under certain operating conditions, for example at high combustion engine rpm and/or low torque, the flow separation in two spirals has a negative effect on the performance of the turbocharger. In order to solve this problem, the state of the art provides overflow areas or volute connecting openings in which the exhaust gases from one spiral can overflow into the other spiral and vice versa. It is also known that these overflow areas can be opened and closed variably via linear actuators with an appropriate valve. It is also known to combine these overflow areas with a bypass opening. This makes it possible to control the bypass opening and the overflow areas with the same valve. Bypass openings are usually used for bypassing the turbine at certain operating conditions, especially at high rotation speeds, in order to prevent damage of the turbocharger. Via a turbine bypass, exhaust gases are guided from a location upstream of the turbine wheel around the turbine wheel, i.e. without flowing over the turbine wheel, to the turbine outlet downstream of the turbine wheel. As turbochargers are driven by exhaust gases temperatures in the volutes may range between 740° C. to 1050° C. or even up to 1200° C., depending on the type of combustion in the engine. Valves operating in exhaust gases are thus exposed to high temperatures and corrosive acids as well as soot particles which may accumulate on internal surfaces of the turbocharger.

To effectively control, i.e. open and close, both—the volute connection opening and the bypass opening, it is crucial that any valve must be capable affording a tight seal and controllable opening with the respective valve seats of the volute connection opening and the bypass opening, without corrosion or jamming due to soot or oil buildup. Increased wear in the action area of the valve and turbine housing as well as noise vibration harshness (NVH) behaviour are known challenges. Particularly, exhaust gas pulses as well as thermal deformations can worsen the sealing function, wear and NVH behaviour. It would also be desirable that such valves could be controlled with high precision, with minimal actuation force and without being adversely affected by high system pressures and/or by high temperatures. To achieve high precision and to fulfill both sealing functions, valves for controlling the volute connection opening and the bypass opening often involve an exhaustive manufacturing and assembly process.

Accordingly, the objective of the present invention is to design a valve for controlling the volute connection opening and the bypass opening of a turbine with improved performance and cost. In particular, the object is to provide a valve for controlling the volute connection opening and the bypass opening that is controllable in high precision, less susceptible to jamming as well as providing a good sealing behaviour whilst being efficient to assemble.

SUMMARY

This present invention relates to a valve assembly for controlling a volute connecting opening and a bypass opening of a dual-volute turbine as set out in claim 1. Furthermore, the invention relates to a corresponding dual-volute turbine and a corresponding exhaust gas turbocharger having such a valve as set out in claims 10 and 15, respectively. Other aspects of the embodiments are described in the dependent claims.

The valve for controlling a volute connecting opening and a bypass opening of a dual-volute turbine comprises a valve closing body, a lever arm and a spindle. The valve closing body has a main body and a collar. The valve is of a monoblock design with the valve closing body, the lever arm and the spindle being made of a single part. The monoblock design leads to a radically simplified manufacturing as well as assembly process. Particularly, the machining process can be simplified. In comparison to multi-part valve designs with various separate parts between the spindle and the valve closing body, only two machining operations, i.e. at outer contour of the spindle and at the outer contour of the valve closing body, are sufficient to bring the valve in a state ready for assembly. Additionally in comparison to a multi-part valve design, no welding is necessary and a better NVH behaviour can be achieved. As the monoblock valve does not has any moving or moveable parts between spindle and valve closing body but is a solid unitary part, there occurs no or at least less rattling and thus wear and vibrations can be reduced. Due to the nature of the monoblock design and less single part tolerances having influence on the clearances between valve body and turbine housing, the accuracy of the control and sealing can be improved. The tolerance chain reduction or elimination within the valve due to having one single part can improve the accuracy of sealing and control. Thereby, a gap between the valve closing body and the volute connection opening can be minimized without the necessity of further sealing measures, e.g. labyrinth seal and/or sealing lips, which is beneficial for the performance of the dual volute turbine stage.

In another aspect, the main body may be substantially bowl shaped. The collar may form a rim of the main body. The collar may define a valve axis.

In another aspect, which is combinable with the previous aspect, an outer contour of the main body may define a volute connection sealing surface for sealing volute connecting opening. The collar may define a bypass sealing surface for sealing the bypass opening. In aspects, the outer contour of the main body may be machined, particularly turned. In aspects, the bypass sealing surface may be machined, particularly turned. Thereby one machining operation is sufficient to bring the valve closing body in its final shape. In aspects, the outer contour of the main body may extend away from the bypass sealing surface. In aspects, the outer contour of the main body may have a curved shape from the bypass sealing surface to a bottom of the main body. The bottom of the main body may be flat. Alternatively, the bottom of the main body may be curved.

In another aspect, which is combinable with any of the previous aspects, the main body may be axisymmetric about the valve axis. In aspects, the outer contour of the main body may be defined by multiple radii about the valve axis. The multiple radii may decrease in a direction from the bypass sealing surface to the bottom of the main body.

In another aspect, which is combinable with any of the previous aspects, the valve closing body may be hollow. More precisely, the main body of the valve closing body may be hollow. Having a hollow valve closing body saves weight and cost. In aspects, the valve closing body may define an empty space inside its interior. Having a monoblock valve, there is no need for any washer or inside geometry for lever arm to valve closing body contact. In aspects, the empty space may be opened towards the collar.

In another aspect, which is combinable with any of the previous aspects, the lever arm may be connected to the collar. Additionally or alternatively, the lever arm may be connected to an inner contour of the main body.

In another aspect, which is combinable with any of the previous aspects, the lever arm may have a curved shape. The curved shape may extend on an upper side of the collar opposite to the bypass sealing surface and between the collar and the spindle. Having a curved lever arm enables a better sealing tightness in use. Due to the curved shape, the lever arm can elastically deform. Thereby, deformations which may for instance be thermally induced can be accounted for. By the elastic deformation at operating torque of the valve a planar contact towards a bypass valve seat of the bypass opening is possible. In other words, a certain degree of tilting of the valve closing body is possible to have a planar contact and sealing tightness between the collar and the bypass valve seat.

In another aspect, which is combinable with any of the previous aspects, the lever arm may extend orthogonally or inclined from a pivoting axis of the spindle for pivoting the valve body about the pivoting axis. In aspects, the lever arm may define a sealing shoulder. The sealing shoulder may circumferentially surround the spindle. The sealing shoulder may point in a direction parallel to the pivoting axis. In aspects, an outer contour of the spindle may be machined, particularly turned. In aspects, the sealing shoulder may be machined, particularly turned. This is particularly advantageous in combination with aspects, in which the outer contour of the valve main body and/or the bypass sealing surface are machined. In these cases only two machining operations may be sufficient to adjust the tolerances. Furthermore, as the shoulder may be in direct contact, the shoulder being machined, i.e. having more accurate dimensions and/or smaller surface roughness than unmachined areas, may lead to less rattle hereby improved NVH behaviour.

In another aspect, which is combinable with any of the previous aspects, the pivoting axis may lie in a plane defined by the bypass sealing surface.

The present disclosure further relates to a modified valve for controlling a volute connecting opening and a bypass opening of a dual-volute turbine being. The modified valve comprises a valve closing body, a lever arm and a spindle. The valve closing body has a main body and a collar. In comparison to the valve previously described herein, the modified valve design may be made of two or more separate components which are connected to form a single part. In particular, the two or more separate components may be fixedly connected. In other words, the two or more components may be connected to form a single part which has a stiff or fixed structure with no moving parts, as e.g. a spring, in between. The two or more separate components may be connected to each other via welding to form the single part modified valve. In aspects, the modified valve may be made of a first sub portion and a second sub portion which is separate from the first sub portion. For instance, one of the first sub portion and the second sub portion may comprise, particularly consist of, the lever arm and the spindle, and the other of the first sub portion and the second sub portion may comprise, particularly consist of, the valve closing body. Alternatively, one of the first sub portion and the second sub portion may comprise, particularly consist of, the lever arm and the valve closing body, and the other of the first sub portion and the second sub portion may comprise, particularly consist of, the spindle. In other embodiments all three, the valve closing body, the lever arm and the spindle may be fabricated from separate components. Optionally, the modified valve may comprise additional components other than the valve closing body, the lever arm and the spindle which are connected to the other portions to form a single piece.

In comparison to the monoblock designed valve described above, the modified valve is single piece valve fabricated from two or more components. On the one hand, this modified valve involves various drawbacks in comparison to the monoblock valve. The manufacturing process requires a separate fabrication of more than one component. Furthermore, at least one additional assembly, particularly, joining process is necessary. In addition, to this joining process a preparation of the parts to be joined, e.g. machining the parts to be joined at joining locations, may be necessary. These joining location increases the tolerance chain in comparison to the monoblock design, which may potentially result in slightly deteriorated clearances between valve body and turbine housing, slightly deteriorated accuracy of the control of the valve and sealing can be improved. On the other hand, as the modified valve does not have any moving or moveable parts between spindle and valve closing body but is a single part after the joining two or more components, there occurs no or at least less rattling and thus wear and vibrations can be reduced in comparison to valves in multi-part design with movable parts. In particular, the modified valve is advantageous in package-constrained applications where the turbine outlet geometry restricts the size of the valve to be inserted. In such applications with only little space required, the two or more components of the modified valve can be inserted into the turbine housing separately and then be joined inside the turbine housing. Thus in geometrically critical or constrained conditions, the modified valve may be advantageous over the valve described above when it comes to insertion and assembly of the valve into the turbine housing.

It should be understood, that except for the monoblock design, the modified valve may comprise one or more of the features as described with respect to the monoblock valve above.

The present invention further relates to a dual-volute turbine for an exhaust gas turbocharger. The turbine may comprise a turbine housing with a first volute and a second volute which are fluidically separated by a divider wall. The turbine may further comprise a turbine wheel which is arranged between a turbine inlet and a turbine outlet of the turbine housing. The turbine housing may define a valve region. The valve region may comprise a volute connection opening and a bypass opening. The volute connection opening may be arranged in the divider wall to fluidically couple the first volute and the second volute. The bypass opening may be arranged over the two volutes to directly fluidically connect the volutes to the turbine outlet. The turbine may further comprise a valve of any one of the preceding aspects. The valve may be arranged at least partially in the valve region so that the valve closing body can interact with volute connection opening and the bypass opening.

In another aspect of the turbine, the turbine may further comprise a bushing which is arranged in a bore of the turbine housing. The bushing may receive the spindle of the valve.

In another aspect of the turbine, which is combinable with any of the previous aspects, the valve may be pivotable between a closed position and an opened position. In the closed position the valve may be configured to suppress flow of exhaust gases through the volute connection opening and the bypass opening. In the opened position, the valve may be configured to allow flow of exhaust gases through the volute connection opening and the bypass opening.

In aspects, the main body may extend through the bypass opening in the closed position such that the volute connection sealing surface interacts with a volute connection valve seat to suppress flow of exhaust gases between the volutes through the volute connection opening. The volute connection valve seat may be defined by the volute connection opening in the divider wall. In other words, the volute connection opening or a first gap formed between the volute connection valve seat and the volute connection sealing surface is minimized. The valve being a monoblock valve advantageously can further help to reduce this first gap due to a reduced tolerance chain.

In another aspect of the turbine, which is combinable with any of the previous aspects, the outer contour of the main body and a contour of the volute connection opening may be shaped substantially complementary to each other.

In another aspect of the turbine, which is combinable with any of the previous aspects, the valve is operable such that the bypass sealing surface sealingly engages with a bypass valve seat located around the bypass opening. In other words, a second gap between the bypass valve seat and the bypass sealing surface can be eliminated or at least minimized.

In another aspect of the turbine, which is combinable with any of the previous aspects, the first volute may open to the turbine wheel via a first inlet portion of the turbine inlet. The second volute may open to the turbine wheel via a second inlet portion of the turbine inlet. The first inlet portion and the second inlet portion may be circumferentially separated from each other. In aspects, one of the first inlet portion and the second inlet portion may cover a circumferential sector of the turbine inlet between about 160° to about 180°. The other of the first inlet portion and the second inlet portion may cover a circumferential sector of the turbine inlet between about 180° to about 200°. The first inlet portion and the second inlet portion together may cover about 360° of the turbine inlet.

It should be understood, that instead of the monoblock valve, the dual-volute turbine may also comprise the modified valve as described above. On or more of the features described above with respect to the dual-volute turbine may also be applicable analogously to the turbine if it comprises the modified valve.

The present invention further relates to an exhaust gas turbocharger for an internal combustion engine or a fuel cell. The exhaust gas turbocharger may comprise a compressor, a bearing housing and a turbine of any one of the previous aspects. The compressor may comprise a compressor wheel and a compressor housing. The bearing housing may comprise a shaft supported therein. The turbine wheel and the compressor wheel may be rotationally coupled via the shaft. In some aspects, the exhaust gas turbocharger may be configured as an electrically assisted turbocharger. Then, the electrically assisted turbocharger may further comprise an electric motor operationally coupled to the shaft.

DETAILED DESCRIPTION

Figure 1A:
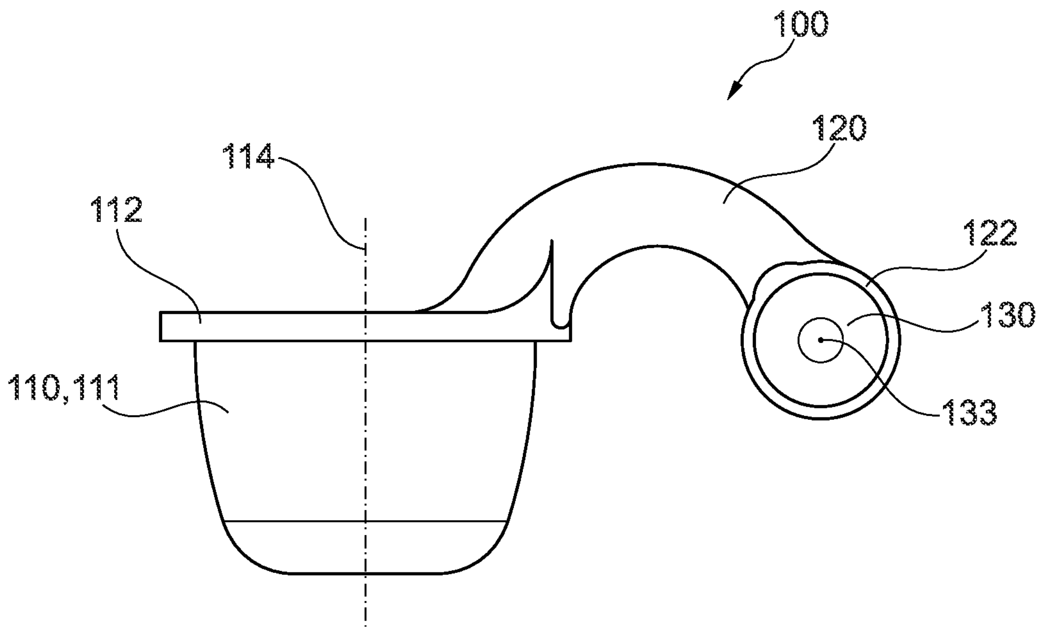
FIGS. 1*a*-1*d* show various views of the monoblock valve disclosed herein.
Figure 1B:
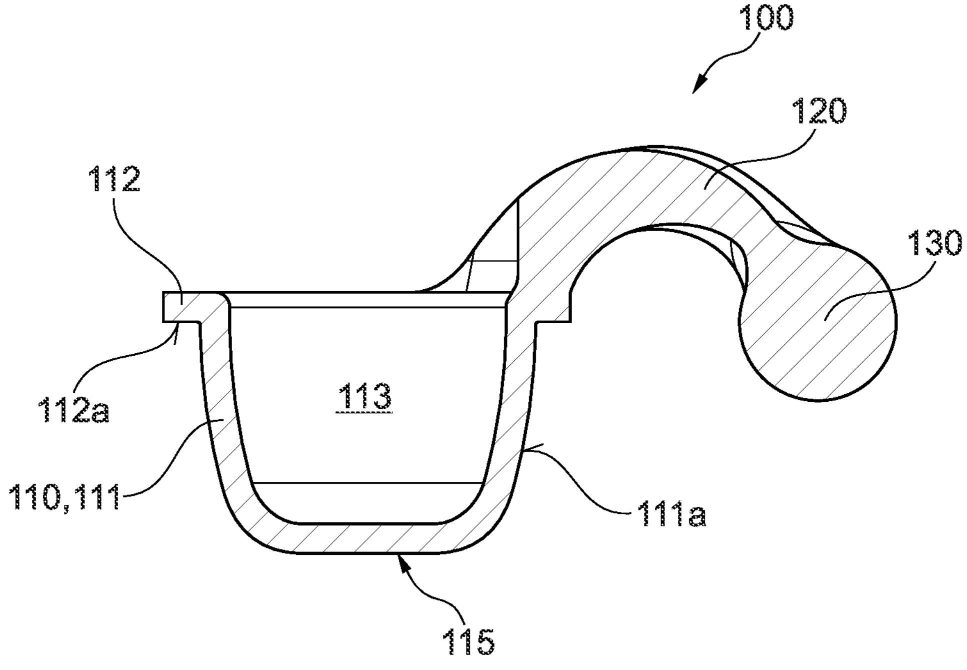
Figure 1C:
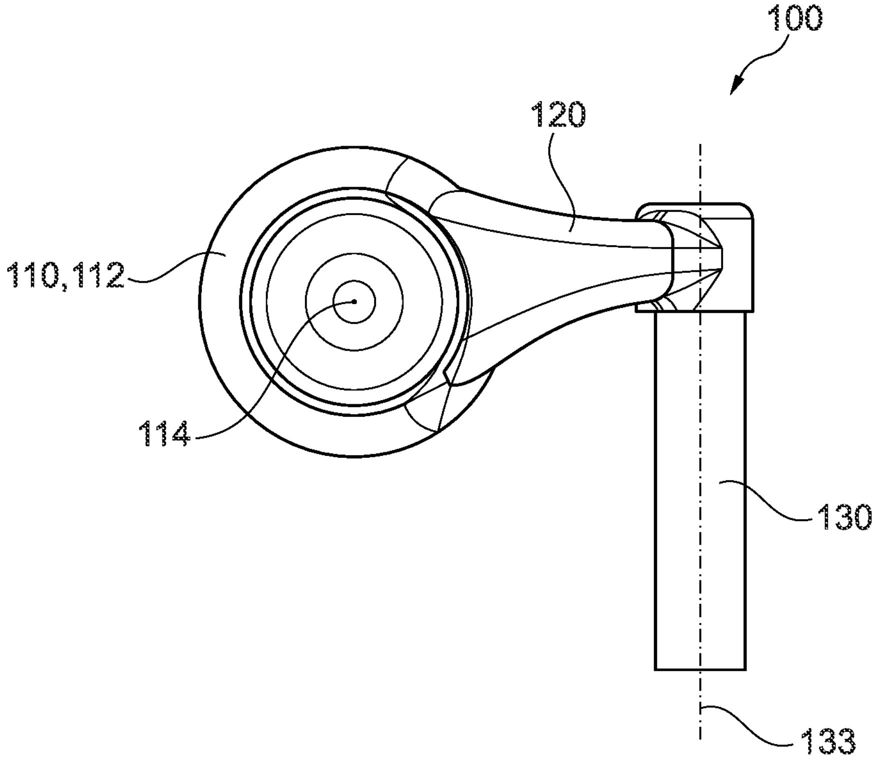

FIGS. 1*a*-1*d* show the valve 100 according to the present invention in various views. FIG. 1*a* shows a side view of the valve 100 with a direction of the pivoting axis 133 being orthogonal to the plane of the figure. FIG. 1*b* shows the valve 100 in a similar view as FIG. 1*a* but in a cut view along a plane of the figure. FIG. 1*c* shows the valve 100 according to the present invention in a perspective view slightly from below such that the areas of the machining operations become visible.

In general, the valve 100 according to the present invention is configured to control a volute connecting opening 240 and a bypass opening 250 of a dual-volute turbine 200 (see, FIGS. 3 to 5 which will be explained further below). The valve 200 comprises a valve closing body 110 which has a main body 111 and a collar 112 (see, e.g., FIG. 1*a*). Furthermore, the valve 200 comprises a lever arm 120 and a spindle 130. As is clearly visible from, for instance FIG. 1*b*, the valve 100 is of a monoblock design with the valve closing body 110, the lever arm 120 and the spindle 130 being made of a single part.

In this respect, "monoblock" may refer to a component being made of a single unitary "block" (e.g., via machining of metallic stock) or to a component which is formed as a single unitary component (e.g., via casting or other process), which may be in a final or near final form. In other words, "monoblock" shall describe a forging or casting made in a single piece, rather than being fabricated from components. The monoblock design leads to a radically simplified manufacturing as well as assembly process. Particularly, the machining process can be simplified. In comparison to multi-part valve designs with various separate parts between the spindle 130 and the valve closing body 110, only two machining operations, i.e. at an outer contour of the spindle 130 and at an outer contour of the valve closing body 110, are sufficient to bring the valve in a state ready for assembly. Additionally in comparison to a multi-part valve design, no welding is necessary and a better NVH behaviour can be achieved. As the monoblock valve does not have any moving or moveable parts between spindle 130 and valve closing body 110 but is a solid unitary part, there occurs no or at least less rattling. Thus, wear and vibrations can be reduced. Due to the nature of the monoblock design and less single part tolerances having influence on the clearances between valve closing body 110 and a turbine housing 230 of the turbine 200, the accuracy of the control and sealing tightness can be improved. The tolerance chain reduction or elimination within the valve 100 due to having one single part can improve the accuracy of sealing and control. Thereby, a gap 242 between the valve closing body 110 and the volute connection opening 240 can be minimized without the necessity of further sealing measures, e.g. labyrinth seal and/or sealing lips, which is beneficial for the performance of the dual-volute turbine 200.

As shown in particular in FIGS. 1*a* and 1*b*, the main body 111 of the valve closing body 110 may be substantially bowl shaped. Alternatively described, the valve closing body 110 or the main body 111 may be hat shaped or pot shaped or bowl shaped. In other words, the main body 111 may be substantially spherical or toroidal. The collar 112 may form a rim of the main body 111. The collar 112 may define a valve axis 114. The collar 111 may be circular (see, FIG. 1*d*). The collar 111 may be axisymmetric about the valve axis 114. The main body 111 may be axisymmetric about the valve axis 114. This is particularly advantageous as it enables a simplified manufacturing and machining. For instance, the main body 111 may be circular in cross section about the valve axis 114 (see, FIG. 1*d*). Alternatively to being circular, the collar 112 may be oval, elliptical, polygonal or may have a free defined shape. Even in these shapes the collar 112 may define the valve axis 114. Analogously, instead of being circular, the main body 111 may be oval, elliptical, polygonal or may have a free defined shape.

Figure 1D:
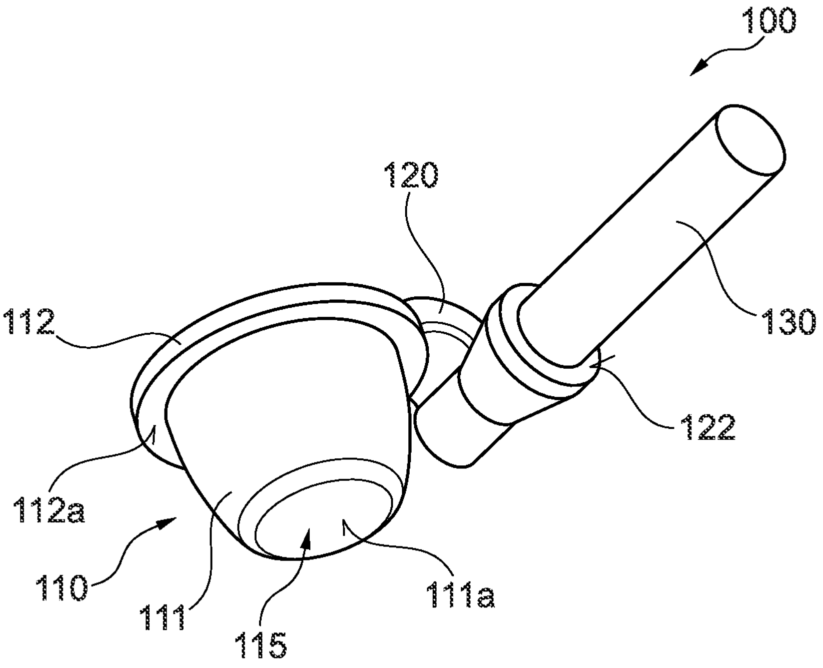

As best seen in FIGS. 1*b* and 1*d*, an outer contour of the main body 111 may define a volute connection sealing surface 111*a* for sealing the volute connecting opening 240. The collar 112 may define a bypass sealing surface 112*a* for sealing the bypass opening 250. The bypass sealing surface 112*a* may be point parallel to the valve axis 114. In other words, the bypass sealing surface 112*a* is orthogonally to the valve axis 114. Alternatively described, the valve axis 114 is normal to a plane defined by the collar 111, in particular, a plane defined by its bypass sealing surface 112*a*. The outer contour of the main body 111 may extend away from the bypass sealing surface 112*a*. The outer contour of the main body 111 may have a curved shape between the bypass sealing surface 112*a* to a bottom 115 of the main body 111. The bottom 115 of the main body 111 may be flat. Alternatively, the bottom 115 of the main body 111 may be curved.

Particularly in configurations in which the main body 111 has a circular shape in cross section about the valve axis 114, the outer contour of the main body 111 may be defined by multiple radii about the valve axis 114. That means in such a configuration the outer contour of the main body 111 is axisymmetric. An axisymmetric configuration advantageously simplifies the manufacturing process whilst due to the monoblock design still a good sealing function of the volute connection opening 240 can be achieved. The multiple radii may decrease in a direction from the bypass sealing surface 112*a* to the bottom 115 of the main body 111, i.e. downward along valve axis 114 in FIGS. 1*a* and 1*b*). Analogously also if the main body 111 is elliptical or oval in cross section about valve axis 114, multiple radii may define the outer contour of the main body 111. In these cases, the radius of a respective plane at an exemplary location of the main body 111 along the valve axis 114 may change in a circumferential direction about the valve axis 114. Particularly, the outer contour of the main body 111 and a contour of the volute connection opening 240 may be shaped substantially complementary to each other. In other words, the bowl shape of the main body 111 is configured such that it conforms to the volute connection opening 240.

Best seen in FIGS. 1*b* and 1*c*, the valve closing body 110 may be hollow. More precisely, the main body 111 of the valve closing body 110 may be hollow. Having a hollow valve closing body 110 saves weight and cost. In preferred embodiments, the valve closing body 110 may define an empty space 113 inside its interior (see, FIGS. 1*b* and 1*c*). The empty space 113 may be opened towards the collar 112. In other words, the collar 112 defines an opening of the empty space 113. By having a valve 100 of monoblock design, there is no necessity for any washer or inside geometry for the connection between lever arm 120 and valve closing body 110.

Figure 2:
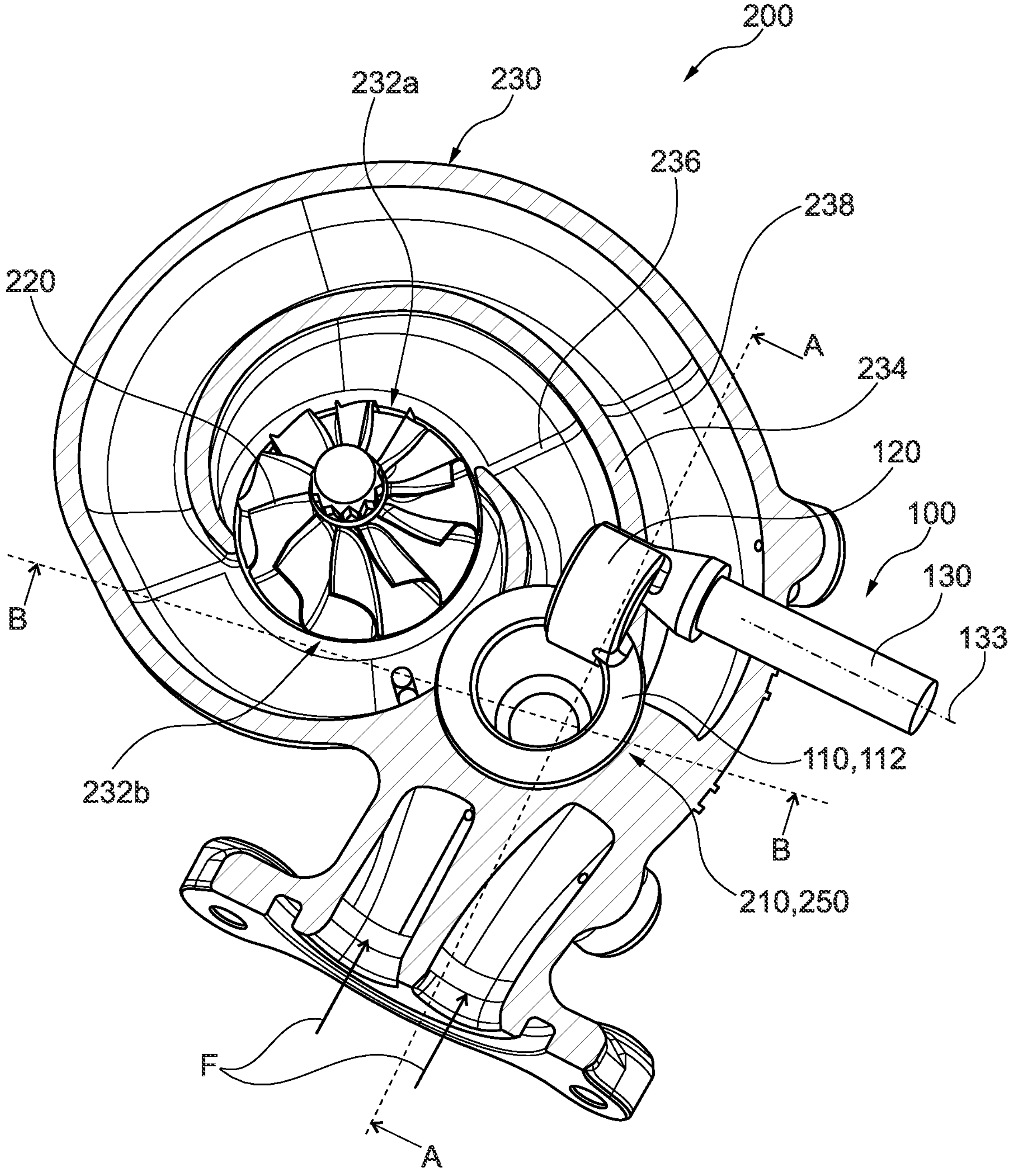
FIG. 2 shows the dual-volute turbine with a cut-view turbine housing and the turbine wheel as well as the valve.

With respect to, for instance FIGS. 1*a* to 1*c*, the lever arm 120 may be connected to the collar 112. In particular, the lever arm 120 may be only connected to the collar 112, for instance to an upper side of the collar 112 opposite to the bypass sealing surface 112*a* (see, FIG. 1*b*). This configuration may save additional material and cost. In alternative embodiments, the lever arm 120 may be connected to an inner contour of the main body 111. In this regard, for instance FIG. 2 shows a slight modification, wherein the lever arm 120 is connected to the collar 112 and to an upper region of the inner contour of the main body 111, i.e. close to the collar 112. However, it should be understood that it is also possible that the lever arm 120 is only connected to the inner contour of the main body 111, for instance to an upper region of the inner contour of the main body 111 and/or to a lower region of the inner contour of the main body 111, i.e. close to the bottom 115.

The spindle 130 may define a pivoting axis 133 (see, e.g. FIGS. 1*a* and 1*c*). The valve 100, particularly the valve closing body 110 is pivotable about the pivoting axis 133. The pivoting axis 133 may lie in a plane defined by the bypass sealing surface 112*a*. In other words, the pivoting axis 133 and the bypass sealing surface 112*a* may be arranged at the same location on the valve axis 114.

The lever arm 120 may be connected to the spindle 130 in a first end region of the spindle 130 (see, FIG. 1*c*). In other words, the lever arm 120 may have a first end. The first end of the lever arm 120 may be connected to a first end region of the spindle 130. The lever arm 120 may have a second end. The second end is opposite of the first end. The second end of the lever arm 120 may be connected to the valve closing body 110. The spindle 130 may have a first end region and an opposite second end region. The spindle 130 extends along the pivoting axis 133 from the first end region to the second end region. When assembled in the turbine housing 230 (see, FIG. 3), the second end region may extend outside the turbine housing 230 to couple the valve 100, particularly the spindle 130, to an actuator (not shown). In the first end region, the lever arm 120 may define a sealing shoulder 122. The sealing shoulder 122 may circumferentially surround the spindle 130. The sealing shoulder 122 may point in a direction parallel to the pivoting axis 133. More precisely, the sealing shoulder 122 defines an annular surface which points in a direction parallel to the pivoting axis 133. Alternatively described, the annular surface defined by the sealing shoulder 122 may be oriented orthogonally to the pivoting axis 133. The sealing shoulder 122 may point from the first end region of the spindle 130 towards its second end region (see, particularly, FIGS. 1*a*, 1*d* and 3). In an assembled state, the sealing shoulder 122 may be adjacently to a bushing 212 (see, FIG. 3).

In advantageous configurations, and as best visible in FIGS. 1*a* and 1*b*, the lever arm 120 may have a curved shape. The curved shape may extend on an upper side of the collar 112 opposite to the bypass sealing surface 112*a* and between the collar 112 and the spindle 130. In other words, the lever arm 120 may not extend along a straight line between the valve closing body 110 and the spindle 130. Alternatively described, the lever arm 120 extends along a curve between the valve closing body 110 and the spindle 130 seen in a plane orthogonal to the plane defined by the bypass sealing surface 112*a* and orthogonal to the pivoting axis 133. Further alternatively described, the lever arm 120 may have a curved shaped in a plane defined by a line parallel to the valve axis 114 and a line extending between the first and second ends of the lever arm 120. The curved shape of the lever arm 120 may also be referred to as arc-shape. The open side of the arc or curve points in a direction substantially parallel to the bypass sealing surface 112*a*. That means the open side points downward as does the bypass sealing surface 112*a* do. Alternatively described, the curved shape is convex and directed upwardly. The curved shape of the lever arm 120 may have one or multiple radii. Having a curved lever arm 120 enables a better sealing tightness of the valve 100 in use. Due to the curved shape, the lever arm 120 can elastically deform. Thereby, deformations of, for instance the turbine housing 230, e.g. the bypass opening 250, which may for instance be thermally induced can be accounted for. By the elastic deformation at operating torque of the valve 100 a planar contact towards a bypass valve seat 252 of the bypass opening 250 is possible. In other words, a certain degree of tilting of the valve closing body 110 relatively to the spindle 130 is possible although having a monoblock design valve 100. Thereby, a planar contact and sealing tightness between the collar 112, particularly its bypass sealing surface 112*a* and the bypass valve seat 252 can be achieved or at least improved. In alternative embodiments (not shown), the lever arm 120 may be substantially straight. That means, the lever arm 120 may extend, for instance, along a straight line parallel to a line from the bypass sealing surface 112*a* to the pivoting axis 133.

As shown in FIG. 1*c*, the lever arm 120 may extend orthogonally with respect to the pivoting axis 133 of the spindle 130 for pivoting the valve body 110 about the pivoting axis 133. In other words, a line extending from the first end and to the second end of the lever arm 120 may be orthogonally with respect to the pivoting axis 133. In alternative embodiments (not shown), the lever arm 120 may extend inclined, for instance about 1° to 30° with respect to the pivoting axis 133, or curved with respect to the pivoting axis 133 of the spindle 130 for pivoting the valve body 110 about the pivoting axis 133.

FIG. 1*d* shows a bottom perspective view of the valve 100 with an outer contour of the spindle 130, the sealing should 122, the bypass sealing surface 112*a* and the outer contour of the main body 111 clearly visible. The outer contour of the spindle 130 may be machined, particularly turned. The sealing shoulder 122 may be machined, particularly turned. The bypass sealing surface 112*a* may be machined, particularly turned. The outer contour of the main body 111 may be machined, particularly turned. Particularly, the sealing shoulder 122 and the outer contour of the spindle 130 may be machined, particularly turned, in one machining operation. Particularly, bypass sealing surface 112*a* and the outer contour of the main body 111 may be machined, particularly turned, in another machining operation. Thereby, only two machining operations may be sufficient to adjust the tolerances of the valve 100. Furthermore, as the sealing shoulder 122 may be in direct contact with the bushing 212, the sealing shoulder 122 being machined, i.e. having more accurate dimensions and/or smaller surface roughness than unmachined areas, may lead to less rattle and improved NVH behaviour in an assembled state.

Figure 3:
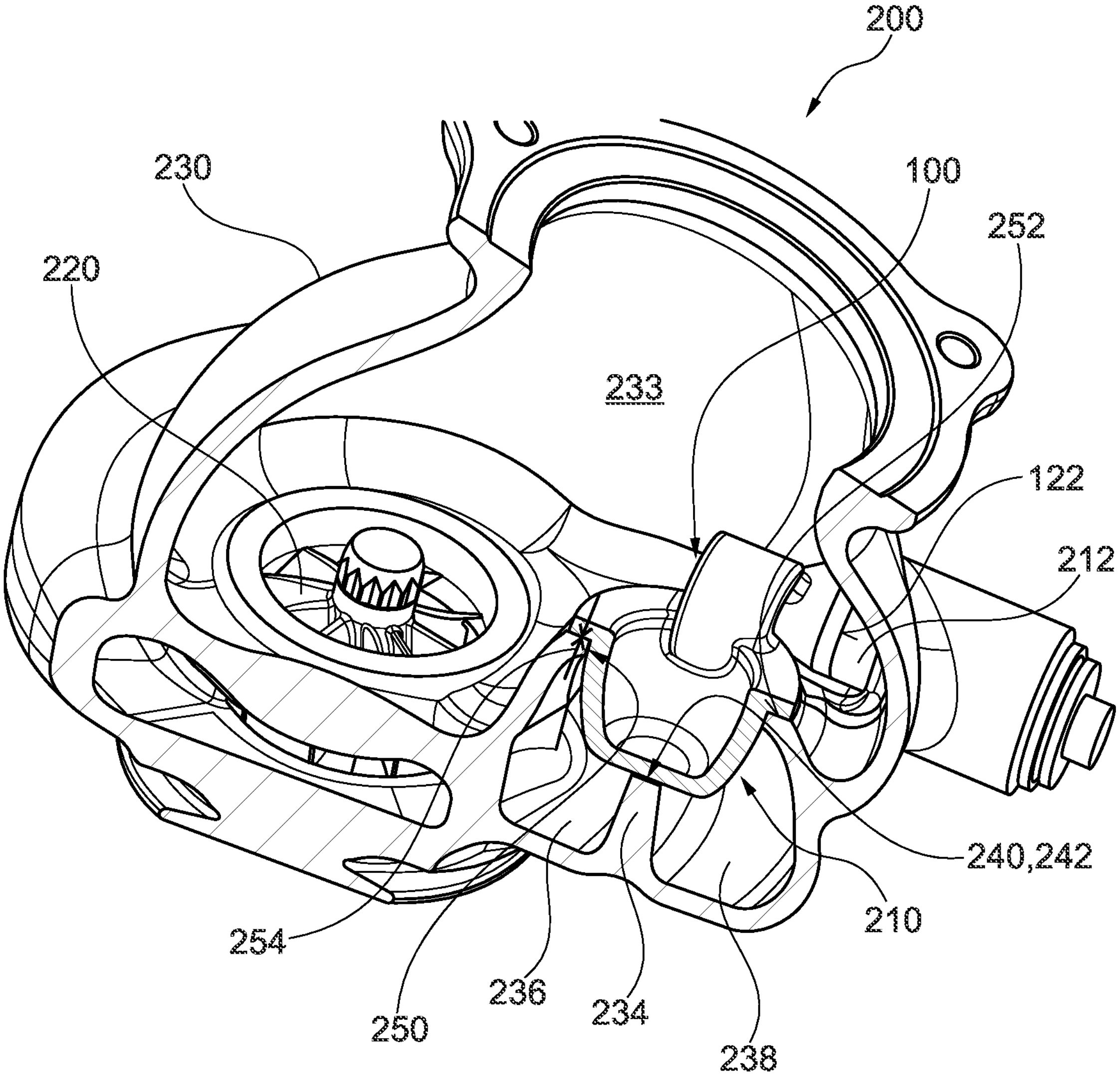
FIG. 3 shows the dual-volute turbine of FIG. 2 with a partial cut-view of the turbine housing and the valve arranged in the turbine housing along the line B-B of FIG. 2, as well as the turbine wheel, the valve being exemplary in a closed position.
Figure 4:
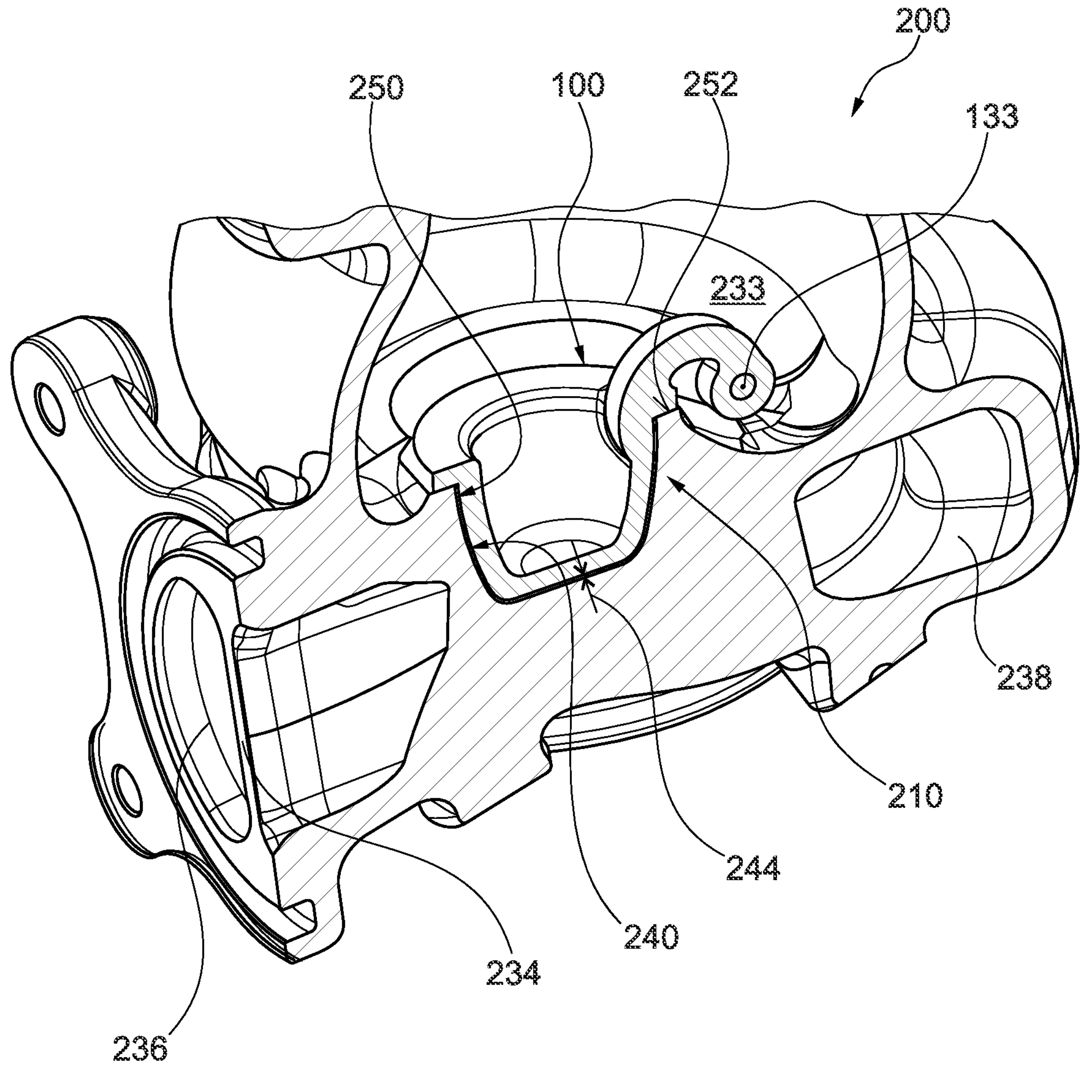
FIG. 4 shows the dual-volute turbine of FIG. 2 with a partial cut-view of the turbine housing and the valve arranged in the turbine housing along the line A-A of FIG. 2, as well as the turbine wheel, the valve being exemplary in a closed position.

With respect to FIGS. 2 to 4, the dual volute turbine 200 in which the valve 100 is arranged in an assembled state is explained in further detail. The dual-volute turbine 200 is configured to be used in an exhaust gas turbocharger (not shown).

As shown in FIG. 2, the turbine 200 comprises a turbine housing 230 and a turbine wheel 220 rotationally arranged within the turbine housing 230. The turbine housing 230 defines a first volute 236 and a second volute 238. The first volute 236 and the second volute 238 are fluidically separated by a divider wall 234. The turbine housing 230 defines a turbine inlet 232*a*, 232*b* and a turbine outlet 233. Exhaust gases enter the turbine housing 230 through the two volutes 236 and 238 in flow direction F (see, FIG. 2). When the valve 100 is in a closed position, the exhaust gas flow through the volutes 236, 238 separated by the divider wall 234 towards the turbine inlet 232*a*, 232*b*. At the turbine inlet 232*a*, 232*b*, the exhaust gases exit the volutes 236, 238 and stream onto the turbine wheel 220. More precisely, the turbine inlet 232*a*, 232*b* has a first inlet portion 232*a* and a second inlet portion 232*b*. The first volute 236 opens to the turbine wheel 220 via the first inlet portion 232*a*. The second volute 238 opens to the turbine wheel 220 via the second inlet portion 232*b*. The turbine wheel 220 is arranged between the turbine inlet 232*a*, 232*b* and the turbine outlet 233. After hitting on the turbine wheel 220, and rotating it thereby, the exhaust gases exit the turbine wheel 220 through the turbine outlet 233. From the turbine outlet 233 the exhaust gases flow further out of the turbine housing 230.

The first inlet portion 232*a* and the second inlet portion 232*b* are circumferentially separated from each other (see, FIG. 2). With regard to the turbine inlet 232*a*, 232*b* and the turbine wheel 220, "circumferential" is to be understood with respect to the rotation axis of the turbine wheel 220. The turbine housing 230 may comprise a first housing tongue and a second housing tongue which separate the first inlet portion 232*a* and the second inlet portion 232*b* circumferentially. First and second housing tongues are thereby arranged offset around turbine wheel 220 by about 180°. Alternatively, first and second housing tongues may be arranged circumferentially around turbine wheel 220 in a range from 160° to 200°, in particular offset by about 175° or about 185°. Described in other words, one of the first inlet portion 232*a* and the second inlet portion 232*b* may cover a circumferential sector of the turbine inlet 232*a*, 232*b* between about 160° to about 180°. The other of the first inlet portion 232*a* and the second inlet portion 232*b* may cover a circumferential sector of the turbine inlet 232*a*, 232*b* between about 180° to about 200°. The first inlet portion 232*a* and the second inlet portion 232*b* together may cover about 360° of the turbine inlet 232*a*, 232*b*. In this context "about" is to be understood as varying 0° to 5°. Particularly, one of the first inlet portion 232*a* and the second inlet portion 232*b* may cover a circumferential sector of the turbine inlet 232*a*, 232*b* between about 170° to about 180° and the other of the first inlet portion 232*a* and the second inlet portion 232*b* may cover a circumferential sector of the turbine inlet 232*a*, 232*b* between about 180° to 190°. Specifically one of the first inlet portion 232*a* and the second inlet portion 232*b* may cover a circumferential sector of the turbine inlet 232*a*, 232*b* of about 175° and the other of the first inlet portion 232*a* and the second inlet portion 232*b* may cover a circumferential sector of the turbine inlet 232*a*, 232*b* about 185°. By having the first inlet portion 232*a* and the second inlet portion 232*b* covering different amounts of circumferential sectors of the turbine inlet 232*a*, 232*b*, e.g. about 175° and about 185°, a high cycle fatigue (HCF) mismatch can be achieved which improves the performance and NVH behaviour of the dual-volute turbine 200.

The turbine housing 230 further defines a valve region 210. The valve region 210 comprises the volute connection opening 240 and the bypass opening 240. The volute connection opening 240 is arranged in the divider wall 234 to fluidically couple the first volute 236 and the second volute 238 (see, FIG. 4). The bypass opening 250 is arranged over or on the two volutes 236, 238 to directly fluidically connect the volutes 236, 238 to the turbine outlet 233 (see, FIGS. 2 and 3). In this context, directly fluidically connectable means a fluidic connection without streaming over the turbine wheel 220. The turbine 200 further comprises the valve 100. The valve 100 is arranged at least partially in the valve region 210 so that the valve closing body 110 can interact with volute connection opening 240 and the bypass opening 250. The turbine 200 may further comprise a bushing 212 which is arranged in a bore of the turbine housing 230. The bushing 212 may receive the spindle 130 of the valve 100 such that the spindle is rotatable in the bushing 212. The bore may be arranged substantially perpendicular to the divider wall 234, i.e. to a tangent running through the divider wall 234 at a position of the valve axis 114 when the valve 100 is in a closed position. The volute connection opening 240 defines a volute connection valve seat 242. The volute connection valve seat 242 may be formed by the divider wall 234 (see, FIGS. 3 and 4). In other words, the volute connection valve seat 242 may be defined by the volute connection opening 240 in the divider wall 234. The bypass opening 250 defines a bypass valve seat 252 located around the bypass opening 250 (see, FIGS. 3 and 4).

The valve 100 is pivotable between a closed position and an opened position. The valve closing body 110 is designed and arranged to seal both the bypass opening 250 and also the volute connection opening 240 in the closed position. 'Sealing' should not be understood as a hermetic seal with respect to the valve region 210. Rather, valve closing body 110 penetrates into the volute connection opening 240 in such a way that an overflow between spirals 236, 238 is substantially suppressed. Suppressing means that a majority of the gas volume flow (exhaust gases) flowing through a respective spiral 236, 238, preferably more than 95% and particularly preferably more than 99% of the gas volume flow of exhaust gases flowing through a respective spiral 236, 238 is prevented from an overflow between spirals 236, 238 by the valve closing body 110, particularly by the main body 111. As shown in FIG. 4, the outer contour of the main body 111 and a contour of the volute connection opening 240, i.e. a shape volute connection valve seat 242, may be shaped substantially complementary to each other. In other words, the volute connection sealing surface 111*a* and the volute connection valve seat 242 are shaped substantially complementary to each other. Substantially complementary can be understand as complementary with a minor gap, i.e. the below mentioned first gap, which us remained to take into account thermal deformation and to prevent sticking or collision or a sealing engagement of the valve closing body with the bypass valve seat 252.

Alternatively described, the valve 100 is operable such that in the closed position the bypass sealing surface 112*a* sealingly engages, e.g. by contacting, with the bypass valve seat 252. Furthermore, the main body 111 may extend through the bypass opening 250 in the closed position such that the volute connection sealing surface 111*a* interacts, e.g. by approaching and/or partially contacting, with the volute connection valve seat 242 to suppress flow of exhaust gases between the volutes 236, 238 through the volute connection opening 240. In other words, the volute connection opening 240 or a first gap 244 formed between the volute connection valve seat 242 and the volute connection sealing surface 111*a* is minimized. A second gap 254 between the bypass valve seat 242 and the bypass sealing surface 112*a* can be eliminated or at least minimized. The bypass valve seat 242 may generally be an annular surface. The bypass valve seat 242, particularly its annular surface, may be oriented parallelly to the bypass sealing surface 112*a* in a closed position of the valve 100. Generally a planar contact between the bypass sealing surface 112*a* and the bypass valve seat 242 is possible. The valve 100 being a monoblock valve advantageously can further help to reduce the first gap due to a reduced tolerance chain. Particularly advantageous if the lever arm 120 has a curved shaped as explained further above such that the bypass sealing surface 112*a* can better align to the bypass valve seat 242 by elastic deformation of the lever arm 120 upon operating torque acting on the spindle 130.

In the opened position (not shown), the valve 100 is configured to allow flow of exhaust gases through the volute connection opening 240 and the bypass opening 250. Although not shown it should be understood that the valve

100, particularly the valve closing body 110, is pivoted clockwise from the closed position as shown in FIG. 4. Multiple intermediate positions between the closed position and the opened position are possible. This means that valve 100 is steplessly adjustable. Expressed in other words, this means that valve 100 is continuously adjustable. By this means, the valve 100 may be flexibly adapted to the most varied of operating states and demands.

The present invention further relates to an exhaust gas turbocharger for an internal combustion engine or a fuel cell. The exhaust gas turbocharger may comprise a compressor, a bearing housing and a turbine of any one of the previous aspects. The compressor may comprise a compressor wheel and a compressor housing. The bearing housing may comprise a shaft supported therein. The turbine wheel and the compressor wheel may be rotationally coupled via the shaft. In some aspects, the exhaust gas turbocharger may be configured as an electrically assisted turbocharger. Then, the electrically assisted turbocharger may further comprise an electric motor operationally coupled to the shaft.

It should be understood that the present invention can also alternatively be defined in accordance with the following embodiments:

1. A valve (100) for controlling a volute connecting opening (240) and a bypass opening (250) of a dual-volute turbine (200),
   the valve (100) comprising a valve closing body (110), a lever arm (120) and a spindle (130), wherein
   the valve closing body (110) has a main body (111) and a collar (112), and
   wherein the valve (100) is of a monoblock design with the valve closing body (110), the lever arm (120) and the spindle (130) being made of a single part.
2. The valve (100) of embodiment 1, wherein the main body (111) is substantially bowl shaped and wherein the collar (112) forms a rim of the main body (111) and defines a valve axis (114).
3. The valve (100) of any one of the preceding embodiments, wherein an outer contour of the main body (111) defines a volute connection sealing surface (111*a*) for sealing volute connecting opening (240), and wherein the collar (112) defines a bypass sealing surface (112*a*) for sealing the bypass opening (250).
4. The valve (100) of embodiment 3, wherein the outer contour of the main body (111) and the bypass sealing surface (112*a*) are machined, particularly turned.
5. The valve (100) of any one of embodiments 3 or 4, wherein the outer contour of the main body extends away from the bypass sealing surface (112*a*).
6. The valve (100) of any one of embodiments 3 to 5, wherein the outer contour of the main body (111) has a curved shape from the bypass sealing surface (112*a*) to a bottom (115) of the main body (111).
7. The valve (100) of embodiment 6, wherein the bottom (115) of the main body (111) is flat.
8. The valve (100) of any one of embodiments 6 or 7, if dependent on embodiment 2, wherein the main body (111) is axisymmetric about the valve axis (114).
9. The valve (100) of embodiment 8, wherein the outer contour of the main body (111) is defined by multiple radii about the valve axis (114) which decrease in a direction from the bypass sealing surface (112*a*) to the bottom (115) of the main body (111).
10. The valve (100) of any one of the preceding embodiments, wherein the valve closing body (110) is hollow.
11. The valve (100) of embodiment 10, wherein the valve closing body (110) defines an empty space (113) inside its interior.
12. The valve (100) of embodiment 11, wherein the empty space (113) is opened towards the collar (112).
13. The valve (100) of any one of the preceding embodiments, wherein the lever arm (120) is connected to the collar (112) and/or to an inner contour of the main body (111).
14. The valve (100) of any one of the preceding embodiments, wherein the lever arm (120) has a curved shape which extends on an upper side of the collar (112) opposite to the bypass sealing surface (112*a*) between the collar (112) and the spindle (130).
15. The valve (100) of any one of the preceding embodiments, wherein the lever arm (120) extends orthogonally or inclined from a pivoting axis (133) of the spindle (130) for pivoting the valve body (110) about the pivoting axis (133).
16. The valve (100) of any one of the preceding embodiments, wherein the lever arm (120) defines a sealing shoulder (122) which circumferentially surrounds the spindle (130) and which points in a direction parallel to the pivoting axis (133).
17. The valve (100) of embodiment 16, wherein an outer contour of the spindle (130) and the sealing shoulder (122) are machined, particularly turned.
18. The valve (100) of any one of embodiments 15 to 17, if dependent on embodiment 3, wherein the pivoting axis (133) lies in a plane defined by the bypass sealing surface (112*a*).
19. A dual-volute turbine (200) for an exhaust gas turbocharger, the turbine (200) comprising:
   a turbine housing (230) with a first volute (236) and a second volute (238) which are fluidically separated by a divider wall (234);
   a turbine wheel (220) arranged between a turbine inlet (232*a*, 232*b*) and a turbine outlet (233) of the turbine housing (230);
   wherein the turbine housing (230) defines a valve region (210), the valve region (210) comprising:
   - a volute connection opening (240) in the divider wall (234) to fluidically couple the first volute (236) and the second volute (238), and
   - a bypass opening (250) via which the volutes (236, 238) are directly fluidically connectable to the turbine outlet (233); and a valve (100) of any one of the preceding embodiments, which is arranged at least partially in the valve region (210) so that the valve closing body (110) can interact with volute connection opening (240) and the bypass opening (250).
20. The dual-volute turbine (200) of embodiment 19, further comprising a bushing (212) which is arranged in a bore of the turbine housing (230) and which receives the spindle (130) of the valve (100).
21. The dual-volute turbine (200) of any one of embodiments 19 or 20, wherein the valve (100) is pivotable between a closed position to suppress flow of exhaust gases through the volute connection opening (240) and the bypass opening (250), and an opened position to allow flow of exhaust gases through the volute connection opening (240) and the bypass opening (250).
22. The dual-volute turbine (200) of embodiment 21, if dependent on embodiment 3, wherein in the closed position the main body (111) extends through the bypass opening (250) and such that the volute connection sealing surface (111*a*) interacts with a volute connection valve seat (242) defined by the volute connection opening (240) in the divider wall (234) to suppress flow of exhaust gases between the volutes (236, 238) through the volute connection opening (240).

23. The dual-volute turbine (200) of any one of embodiments 19 to 22, if dependent on embodiment 3, wherein the outer contour of the main body (111) and a contour of the volute connection opening (240) are shaped substantially complementary to each other.

24. The dual-volute turbine (200) of any one of embodiments 19 to 23, if dependent on embodiment 3, wherein the valve (100) is operable such that the bypass sealing surface (112*a*) sealingly engages with a bypass valve seat (252) located around the bypass opening (250).

25. The dual-volute turbine (200) of any one of embodiments 19 to 24, wherein the first volute (236) opens to the turbine wheel (220) via a first inlet portion (232*a*) of the turbine inlet (232*a*, 232*b*) and wherein the second volute (238) opens to the turbine wheel (220) via a second inlet portion (232*b*) of the turbine inlet (232*a*, 232*b*) which are circumferentially separated from each other.

26. The dual-volute turbine (200) of embodiment 25, wherein one of the first inlet portion (232*a*) and the second inlet portion (232*b*) covers a circumferential sector of the turbine inlet (232*a*, 232*b*) between about 160° to about 180° and the other of the first inlet portion (232*a*) and the second inlet portion (232*b*) covers a circumferential sector of the turbine inlet (232*a*, 232*b*) between about 180° to about 200° such that the first inlet portion (232*a*) and the second inlet portion (232*b*) together cover about 360°.

27. An exhaust gas turbocharger for an internal combustion engine or a fuel cell comprising:

a compressor with a compressor wheel and a compressor housing, the turbine (200) of any one of embodiments 19 to 26, and a bearing housing with a shaft supported therein, wherein the turbine wheel and the compressor wheel are rotationally coupled via the shaft.

28. The exhaust gas turbocharger of embodiment 27 being configured as an electrically assisted turbocharger and further comprising an electric motor operationally coupled to the shaft.

The invention claimed is:

1. A valve (100) for controlling a volute connecting opening (240) and a bypass opening (250) of a dual-volute turbine (200), the valve (100) comprising a valve closing body (110), a lever arm (120) and a spindle (130), wherein the valve closing body (110) has a main body (111) and a collar (112), and wherein the valve (100) is of a monoblock design with the valve closing body (110), the lever arm (120) and the spindle (130) being made of a single part, wherein an outer contour of the main body (111) defines a volute connection sealing surface (112*a*) for sealing volute connecting opening (240), and wherein the collar (112) defines a bypass sealing surface (112*a*) for sealing the bypass opening (250), wherein the outer contour of the main body (111) has a curved shape from the bypass sealing surface (112*a*) to a bottom (115) of the main body (111), wherein the main body (111) is axisymmetric about a valve axis (114), wherein the outer contour of the main body (111) is defined by multiple radii about the valve axis (114) which decrease in a direction from the bypass sealing surface (112*a*) to the bottom (115) of the main body (111), wherein the lever arm (120) has a curved shape which extends on an upper side of the collar (112) opposite to the bypass sealing surface (112*a*) between the collar (112) and the spindle (130) such that the bypass sealing surface (112*a*) is better aligned to a bypass valve seat (252) located around the bypass opening (250) by elastic deformation of the lever arm (120) upon operating torque acting on the spindle (130), and wherein the outer contour of the main body (111) and the bypass sealing surface (112*a*) are machined, such that a first gap (244) formed between the volute connection valve seat (242) and the volute connection sealing surface (112*a*) is minimized and such that a second gap (254) between the bypass valve seat (242) and the bypass sealing surface (112*a*) is eliminated or minimized by the machined monoblock valve (100).

2. The valve (100) of claim 1, wherein the main body (111) is substantially bowl shaped and wherein the collar (112) forms a rim of the main body (111) and defines a valve axis (114).

3. The valve (100) of claim 1, wherein the valve closing body (110) is hollow.

4. The valve (100) of claim 1, wherein the lever arm (120) is connected to at least one of the collar (112) and an inner contour of the main body (111).

5. The valve (100) of claim 1, wherein the lever arm (120) defines a sealing shoulder (122) which circumferentially surrounds the spindle (130) and which points in a direction parallel to a pivoting axis (133) defined by the spindle (130).

6. The valve (100) of claim 5, wherein an outer contour of the spindle (130) and the sealing shoulder (122) are machined.

7. A dual-volute turbine (200) for an exhaust gas turbocharger, the turbine (200) comprising:

a turbine housing (230) with a first volute (236) and a second volute (238) which are fluidically separated by a divider wall (234);

a turbine wheel (220) arranged between a turbine inlet (232*a*, 232*b*) and a turbine outlet (233) of the turbine housing (230);

wherein the turbine housing (230) defines a valve region (210), the valve region (210) comprising:

a volute connection opening (240) in the divider wall (234) to fluidically couple the first volute (236) and the second volute (238), and a bypass opening (250) via which the volutes are directly fluidically connectable to the turbine outlet (233); and the value (100) of claim 1 which is arranged at least partially in the valve region (210) so that the valve closing body (110) can interact with volute connection opening (240) and the bypass opening (250).

8. The dual-volute turbine (200) of claim 7, wherein the valve (100) is pivotable between a closed position to suppress flow of exhaust gases through the volute connection opening (240) and the bypass opening (250), and an opened position to allow flow of exhaust gases through the volute connection opening (240) and the bypass opening (250).

9. The dual-volute turbine (200) of claim 8, wherein the main body (111) is substantially bowl shaped and the collar (112) forms a rim of the main body (111) and defines the valve axis (114), wherein an outer contour of the main body (111) defines a volute connection sealing surface (111*a*) for sealing volute connecting opening (240), and wherein the collar (112) defines the bypass sealing surface (112*a*) for sealing the bypass opening (250), wherein in the closed position the main body (111) extends through the bypass opening (250) and such that the volute connection sealing surface (111*a*) interacts with a volute connection valve seat (242) defined by the volute connection opening (240) in the divider wall (234) to suppress flow of exhaust gases between the volutes (236, 238) through the volute connection opening (240).

10. The turbine (200) of claim 7, wherein the pivoting axis (133) lies in a plane defined by the bypass sealing surface (112*a*).

11. The dual-volute turbine (200) of claim 7, wherein the main body (111) is substantially bowl shaped and the collar (112) forms a rim of the main body (111) and defines a valve axis (114), wherein an outer contour of the main body (111) defines a volute connection sealing surface (111*a*) for sealing volute connecting opening (240), and wherein the collar (112) defines a bypass sealing surface (112*a*) for sealing the bypass opening (250), wherein the outer contour of the main body (111) and a contour of the volute connection opening (240) are shaped substantially complementary to each other.

12. The dual-volute turbine (200) of claim 7, wherein the main body (111) is substantially bowl shaped and the collar (112) forms a rim of the main body (111) and defines a valve axis (114), wherein an outer contour of the main body (111) defines a volute connection sealing surface (111*a*) for sealing volute connecting opening (240), wherein the valve (100) is operable such that the bypass sealing surface (112*a*) sealingly engages with a bypass valve seat (252) located around the bypass opening (250).

13. An exhaust gas turbocharger for an internal combustion engine or a fuel cell comprising:

a compressor with a compressor wheel and a compressor housing, the turbine (200) of claim 10, and a bearing housing with a shaft supported therein, wherein the turbine wheel and the compressor wheel are rotationally coupled via the shaft.

14. The valve (100) of claim 1, wherein an outer contour of the main body (111) defines a volute connection sealing surface (111*a*) for sealing volute connecting opening (240), and wherein the collar (112) defines a bypass sealing surface (112*a*) for sealing the bypass opening (250).

15. The valve (100) of claim 1, wherein the pivoting axis (133) lies in a plane defined by the bypass sealing surface (112*a*).

* * * * *